United States Patent
Alibeiginabi et al.

(10) Patent No.: US 12,347,209 B2
(45) Date of Patent: Jul. 1, 2025

(54) TRAINING OF 3D LANE DETECTION MODELS FOR AUTOMOTIVE APPLICATIONS

(71) Applicant: ZENSEACT AB, Gothenburg (SE)

(72) Inventors: Mina Alibeiginabi, Gothenburg (SE); Erik Brorsson, Gothenburg (SE); Silas Ulander, Lerum (SE); Benjamin Waubert, Gothenburg (SE)

(73) Assignee: ZENSEACT AB, Gothenburg (SE)

( * ) Notice: Subject to any disclaimer, the term of this patent is extended or adjusted under 35 U.S.C. 154(b) by 356 days.

(21) Appl. No.: 17/884,716

(22) Filed: Aug. 10, 2022

(65) Prior Publication Data
US 2023/0074419 A1    Mar. 9, 2023

(30) Foreign Application Priority Data
Aug. 17, 2021    (EP) .................................... 21191605

(51) Int. Cl.
*G06V 20/56*    (2022.01)
*G06V 10/774*    (2022.01)
(Continued)

(52) U.S. Cl.
CPC ........ *G06V 20/588* (2022.01); *G06V 10/7753* (2022.01); *G06V 10/82* (2022.01); *G06V 20/64* (2022.01)

(58) Field of Classification Search
CPC .. G06V 20/588; G06V 10/7753; G06V 10/82; G06V 20/64
See application file for complete search history.

(56) References Cited

U.S. PATENT DOCUMENTS 10,867,190 B1 * 12/2020 Vajna ................... G06V 10/776
2019/0171223 A1    6/2019 Liang et al.
(Continued)

FOREIGN PATENT DOCUMENTS

WO    2008/091565 A1    7/2008

OTHER PUBLICATIONS

Extended European Search Report mailed Feb. 9, 2022 for European Application No. 21191605.1, 7 pages.
Ghafoorian, Mohsen et al.; "EL-GAN: Embedding Loss Driven Generative Adversarial Networks for Lane Detection"; Cornell University Library; www.arxiv.org; Jun. 14, 2018; 14 pages.
(Continued)

*Primary Examiner* — John Villecco
*Assistant Examiner* — Kyla Guan-Ping Tiao Allen
(74) *Attorney, Agent, or Firm* — Sage Patent Group

(57) ABSTRACT

The present invention relates to a method for training artificial neural network configured for 3D lane detection based on unlabelled image data from camera. The method includes generating a first set of 3D lane boundaries in first coordinate system based on first image, generating a second set of 3D lane boundaries in second coordinate system based on second image, transforming at least one of the second set of 3D lane boundaries and first set of 3D lane boundaries based on positional data associated with first image and second image, evaluating the first set of 3D lane boundaries against second set of 3D lane boundaries in common coordinate system in order to find matching lane pairs of first set of 3D lane boundaries and second set of 3D lane boundaries, and updating one or more model parameters of an artificial neural network based on a spatio-temporal consistency loss.

13 Claims, 5 Drawing Sheets

(51) Int. Cl.
  *G06V 10/82* (2022.01)
  *G06V 20/64* (2022.01)

(56) References Cited

U.S. PATENT DOCUMENTS

| | | | |
|---|---|---|---|
| 2019/0286153 A1* | 9/2019 | Rankawat | G05D 1/0246 |
| 2019/0325595 A1* | 10/2019 | Stein | G06V 10/82 |
| 2019/0384304 A1* | 12/2019 | Towal | G05D 1/0221 |
| 2020/0089232 A1* | 3/2020 | Gdalyahu | G05D 1/0276 |
| 2020/0218907 A1* | 7/2020 | Baik | G06F 17/16 |
| 2020/0218909 A1* | 7/2020 | Myeong | G06V 20/588 |
| 2020/0249684 A1 | 8/2020 | Onofrio et al. | |
| 2020/0310450 A1* | 10/2020 | Reschka | G05D 1/0088 |
| 2022/0024518 A1* | 1/2022 | Yang | B62D 15/0255 |

OTHER PUBLICATIONS

Garnett, Noa et al.; "3D-LaneNet: End-to-End 3D Multiple Lane Detection"; Proceedings of the IEEE/CVF International Conference on Computer Vision (ICCV), 2019, pp. 2921-2930 (10 pages).

Guo, Yuliang et al.; "Gen-LaneNet: A Generalized and Scalable Approach for 3D Lane Detection"; European Conference on Computer Vision (ECCV); 2020; ages 666-681 (16 pages).

Communication pursuant to Article 94(3) EPC mailed Jan. 17, 2025 for European Patent Application No. 21181605.1, 6 pages.

Wang, Guangming et al.; "Unsupervised Learning of 3D Scene Flow from Monocular Camera"; 2021 IEEE International Conference on Robotics and Automation (IRCA 2021); Xi'an, China; May 31-Jun. 4, 2021; XP033989496; pp. 4325-4331 (7 pages).

Communication pursuant to Article 94(3) EPC mailed Jan. 17, 2025 for European Patent Application No. 21191605.1, 6 pages.

\* cited by examiner

TRAINING OF 3D LANE DETECTION MODELS FOR AUTOMOTIVE APPLICATIONS

CROSS-REFERENCE TO RELATED APPLICATIONS

The present application for patent claims priority to European Patent Office Application Ser. No. 21191605.1, entitled "TRAINING OF 3D LANE DETECTION MODELS FOR AUTOMOTIVE APPLICATIONS" filed on Aug. 17, 2021, assigned to the assignee hereof, and expressly incorporated herein by reference.

TECHNICAL FIELD

The present invention relates, in general, to the field of autonomous and semi-autonomous vehicles, and in particular to a method for unsupervised and semi-supervised training of 3D lane detection models.

BACKGROUND

During the last few years, the research and development activities related to autonomous vehicles have exploded in number and many different approaches are being explored. An increasing portion of modern vehicles have advanced driver-assistance systems (ADAS) to increase vehicle safety and more generally road safety. ADAS—which for instance may be represented by adaptive cruise control (ACC) collision avoidance system, forward collision warning, etc.—are electronic systems that may aid a vehicle driver while driving. Today, there is ongoing research and development within a number of technical areas associated to both the ADAS and the Autonomous Driving (AD) field. ADAS and AD will herein be referred to under the common term Automated Driving System (ADS) corresponding to all of the different levels of automation as for example defined by the SAE J3016 levels (0-5) of driving automation, and in particular for level 4 and 5.

In a not too distant future, ADS solutions are expected to have found their way into a majority of the new cars being put on the market. An ADS may be construed as a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all or at least some responsibilities to the system. An ADS commonly combines a variety of sensors to perceive the vehicle's surroundings, such as e.g. radar, LIDAR, sonar, camera, navigation system e.g. GPS, odometer and/or inertial measurement units (IMUs), upon which advanced control systems may interpret sensory information to identify appropriate navigation paths, as well as obstacles, free-space areas, and/or relevant signage.

Deep Learning (DL) is a promising technology in the area of perception, for example in order to detect and classify objects in images, video streams and/or LIDAR point clouds. However, the problem with DL is that it quickly reaches some level of performance, but then extremely large amounts of data are required to get truly high performance. Annotating millions of images is expensive, and hence many initiatives are taken in the autonomous driving field to reduce this cost through semi-automated annotation and learning efficiently from the annotated data.

Lane detection is employed in various ADS features, such as ACC, Lane Departure Warning (LDW), Lane Change Assist (LCA), aside from being a necessary function for fully autonomous vehicles. There are two main approaches to lane detection (may also be referred to as lane marker detection or lane boundary detection). One approach involves the determination of the vehicle's position relative to the lanes (lane markers), which can be computed by using maps created offline and by monitoring the vehicle's position in the map. The other approach relies on the use of the on-board perception system, which can allow for detecting lanes during run-time without relying on any offline created map. The first approach (offline approach) to lane detection may for example be accomplished by combining GPS data, Inertial Measurement Unit (IMU) data, and an HD-map. However, the reliability and accuracy of such approaches has been questioned and a run-time approach is likely to be needed for any fully autonomous solutions.

Today, the run-time lane detection methods are most often based on perception data from monocular cameras. In more detail, these methods generally include four main steps. Firstly, there is a local lane feature extraction, followed by lane model fitting and spatial transformation (i.e. image-to-world correspondence). Lastly, there is a temporal aggregation step (i.e. tracking lanes via filtering approaches). Thus, the majority of the camera-based lane detection methods treat the problem as a 2D task in the image plane.

Further, the semantic segmentation approach is among the most popular deep learning methods for lane detection using monocular cameras. In more detail, a deep convolutional neural network is trained to find the pixels in an image that correspond to a lane then using some method of lane model fitting to create lane instances from the detected pixels. When the lane detections have been made in the image, the lanes are oftentimes projected to 3D coordinates under a "flat earth" assumption. However, such methods may struggle with drawbacks in terms of providing inaccurate estimates of the 3D position of the lanes when the road is "hilly", "banked" or "curvy", even if each pixel in the image is classified correctly.

To overcome the shortcomings associated with the flat earth assumption, some methods tried to directly address 3D lane detection using a monocular camera. These end-to-end data-driven approaches can generalize the lane detection problem to complex structures (e.g. urban environments, splits, merges, intersections) without making any geometric assumption about the number or the topology of the lanes. Moreover, these end-to-end approaches do not need any post-processing step as they unify the image encoding, image-to-world correspondence, and the lane model fitting steps.

However, like many data-driven approaches these models must be trained on vast amounts of annotated data, in this case in the form of annotated 3D lanes. These 3D lane annotations are quite expensive in comparison to 2D lane annotations, and generating 3D information and connectivity for image features using manual annotations can be difficult and error-prone due to the imperfect time synchronization between the camera images and the LiDAR point clouds, sparsity of LiDAR point clouds especially at further distances, as well as the precision of the aggregation and projection of the point clouds.

There is therefore a need in the art for new and improved lane detection solutions for ADS-equipped vehicles, which provide reliable and accurate lane detections and which can be developed/trained in a cost-effective manner.

SUMMARY

It is therefore an object of the present invention to provide a method for training an artificial neural network configured for 3D lane detection based on unlabelled image data from a vehicle-mounted camera, a computer-readable storage medium, an apparatus, a vehicle comprising such an apparatus, a remote server comprising such an apparatus, and a cloud environment comprising one or more such remote servers, which alleviate all or at least some of the above-discussed drawbacks of presently known systems and methods.

This object is achieved by means of a method for training an artificial neural network configured for 3D lane detection based on unlabelled image data from a vehicle-mounted camera, a computer-readable storage medium, an apparatus, a vehicle comprising such an apparatus, a remote server comprising such an apparatus, and a cloud environment comprising one or more such remote servers, as defined in the appended independent claims. The term exemplary is in the present context to be understood as serving as an instance, example or illustration.

According to a first aspect of the present invention, there is provided a method for training an artificial neural network configured for 3D lane detection based on unlabelled image data from a vehicle-mounted camera. The method comprises generating, by means of the artificial neural network, a first set of 3D lane boundaries in a first coordinate system based a first image captured by the vehicle-mounted camera. The method further comprises generating, by means of the artificial neural network, a second set of 3D lane boundaries in a second coordinate system based on a second image captured by the vehicle mounted camera. The second image is captured at a later moment in time compared to the first image and the first image and the second image contain at least partly overlapping road portions. Further, the method comprises transforming at least one of the second set of 3D lane boundaries and the first set of 3D lane boundaries based on positional data associated with the first image and the second image, such that the first set of 3D lane boundaries and the second set of 3D lane boundaries have a common coordinate system. The method further comprises evaluating the first set of 3D lane boundaries against the second set of 3D lane boundaries in the common coordinate system in order to find matching lane pairs of the first set of 3D lane boundaries and the second set of 3D lane boundaries. Furthermore, the method comprises updating one or more model parameters of the artificial neural network based on a spatio-temporal consistency loss between the found matching lane pairs of the first set of 3D lane boundaries and the second set of 3D lane boundaries.

According to a second aspect of the present invention, there is provided a (non-transitory) computer-readable storage medium storing one or more programs configured to be executed by one or more processors of a processing system, the one or more programs comprising instructions for performing the method according to any one of the embodiments disclosed herein. With this aspect of the invention, similar advantages and preferred features are present as in the previously discussed first aspect of the invention.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

According to a third aspect of the present invention, there is provided apparatus for training an artificial neural network configured for 3D lane detection based on unlabelled image data from a vehicle-mounted camera. The apparatus comprises control circuitry configured to generate, by means of the artificial neural network, a first set of 3D lane boundaries in a first coordinate system based a first image captured by the vehicle-mounted camera. The control circuitry is further configured to generate, by means of the artificial neural network, a second set of 3D lane boundaries in a second coordinate system based on a second image captured by the vehicle mounted camera. The second image is captured at a later moment in time compared to the first image and the first image and the second image contain at least partly overlapping road portions. Further, the control circuitry is configured to transform at least one of the second set of 3D lane boundaries and the first set of 3D lane boundaries based on positional data associated with the first image and the second image, such that the first set of 3D lane boundaries and the second set of 3D lane boundaries have a common coordinate system. The positional data may example be obtained from a localization system (e.g. a GPS unit) of the vehicle. The control circuitry is further configured to evaluate the first set of 3D lane boundaries against the second set of 3D lane boundaries in the common coordinate system in order to find matching lane pairs of the first set of 3D lane boundaries and the second set of 3D lane boundaries. Moreover, the control circuitry is configured to update one or more model parameters of the artificial neural network based on a spatio-temporal consistency loss between the found matching lane pairs of the first set of 3D lane boundaries and the second set of 3D lane boundaries. With this aspect of the invention, similar advantages and preferred features are present as in the previously discussed first aspect of the invention.

In some embodiments, the control circuitry is configured to update the one or more parameters of the artificial neural network by penalizing the artificial neural network based on the spatio-temporal consistency loss between matching lane pairs of the first set of 3D lane boundaries and the second set of 3D lane boundaries.

In some embodiments, the control circuitry is configured to determine an average distance between each lane of the first set of 3D lane boundaries and each lane of the second set of 3D lane boundaries in the common coordinate system. The control circuitry may be further configured to compare the determined average distances against an average distance threshold, and determine each lane pair having a determined average distance below the average distance threshold as a matching lane pair.

In some embodiments, the artificial neural network is configured to generate a set of anchor lines where each anchor line is associated with a confidence value indicative of a presence of a lane boundary at the corresponding anchor line.

Further, in some embodiments, the control circuitry is configured to disregard any anchor line associated with a confidence value below a confidence value threshold in the transformation step.

In some embodiments, the control circuitry is configured to update the one or more model parameters of the artificial neural network is further based on the confidence values of any anchor lines associated with matching lane pairs and any anchor lines associated with non-matching lane pairs, such that any anchor lines associated with matching lane pairs should predict a normalized confidence level of 1,0 and any anchor lines associated with non-matching lane pairs should predict a normalized confidence value of 0.

According to a fourth aspect of the present invention, there is provided a vehicle comprising a camera configured to capture images of at least a portion of a surrounding environment of the vehicle. The vehicle further comprises a localization system configured to monitor a geographical position of the vehicle, and an apparatus according to any one of the embodiments disclosed herein.

According to a fifth aspect of the present invention, there is provided a remote server comprising the apparatus according to any one of the embodiments of the third aspect disclosed herein. With this aspect, similar advantages and preferred features are present as in the previously discussed aspects and vice versa.

According to a sixth aspect of the present invention, there is provided a cloud environment comprising one or more remote servers according to any one of the embodiments of the fifth aspect disclosed herein. With this aspect, similar advantages and preferred features are present as in the previously discussed aspects and vice versa.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF THE DRAWINGS

Further objects, features and advantages of embodiments of the invention will appear from the following detailed description, reference being made to the accompanying drawings, in which.

DETAILED DESCRIPTION

In the following detailed description, embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs), Field Programmable Gate Arrays (FPGA) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

Overview

The present invention is at least partly motivated by the recent success of 3D lane detection models (end-to-end data-driven approaches), as well as semi-supervised learning methods. Accordingly, the present inventors hereby introduce a spatio-temporal consistency loss for 3D lane detection that is used to train suitable artificial neural networks (may also be referred to as self-learning models) on unlabelled data in a semi-supervised fashion.

Figure 6:
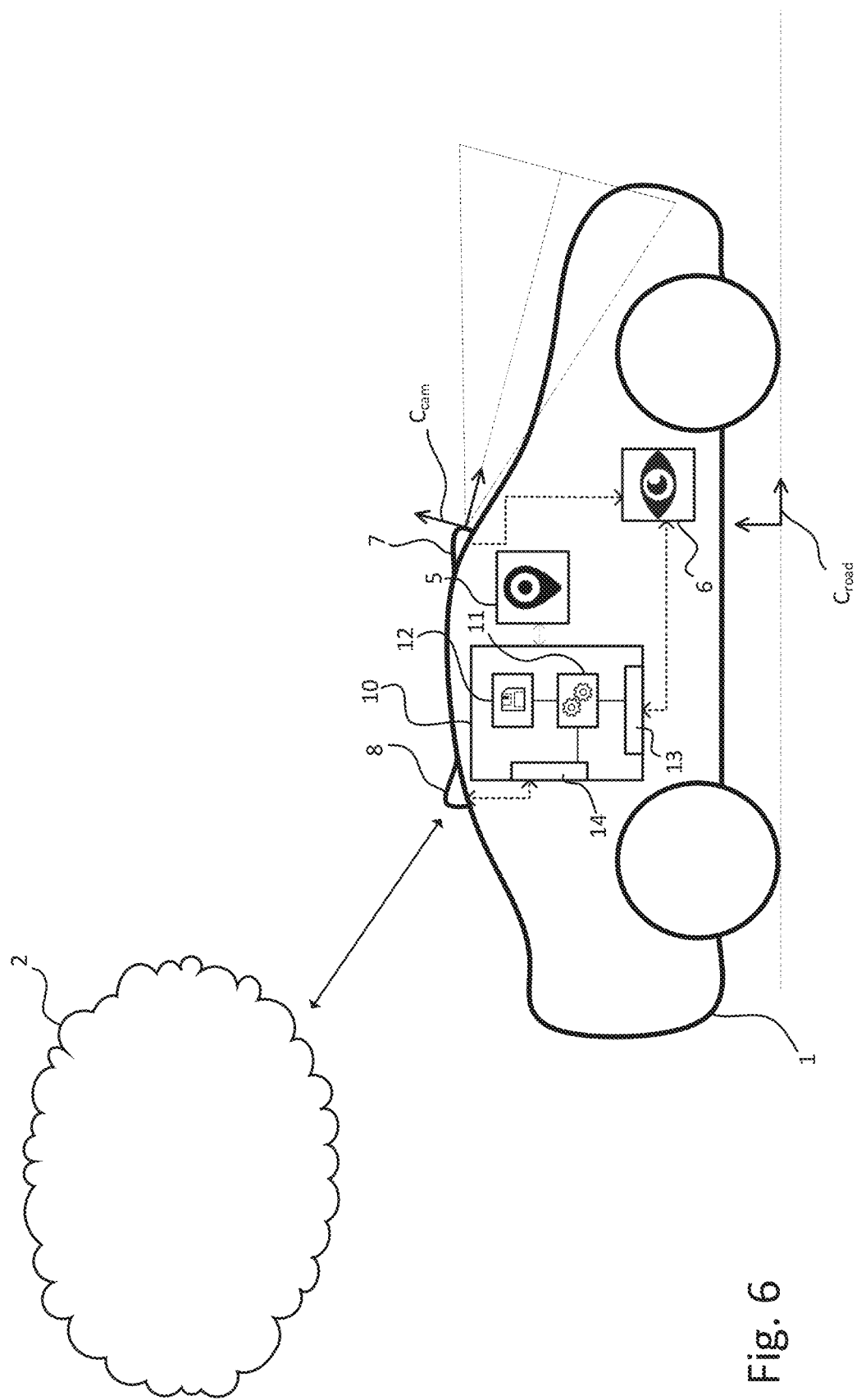
FIG. 6 is a schematic side-view of a vehicle comprising an apparatus comprising control circuitry configured to perform a method in accordance with some embodiments of the present invention.

There are two main coordinate systems used in the present disclosure, $C_{cam}$ and $C_{road}$ (see, e.g., FIG. 6). The first coordinate system $C_{cam}$ is simply defined as the system with the camera in the origin and orientated with the forward direction pointing in the direction of the camera. The second coordinate system $C_{road}$ lies straight beneath $C_{cam}$ but is oriented such that the forward direction is aligned with the road surface. This means that the two systems differ by both a rotation and height offset due to the pitch which the camera is mounted with. The transformation between $C_{cam}$ and $C_{road}$ is hence done by translating the system with the pitch of the camera such that the forward direction points along the road surface and then translating the system down to the road.

Figure 1:
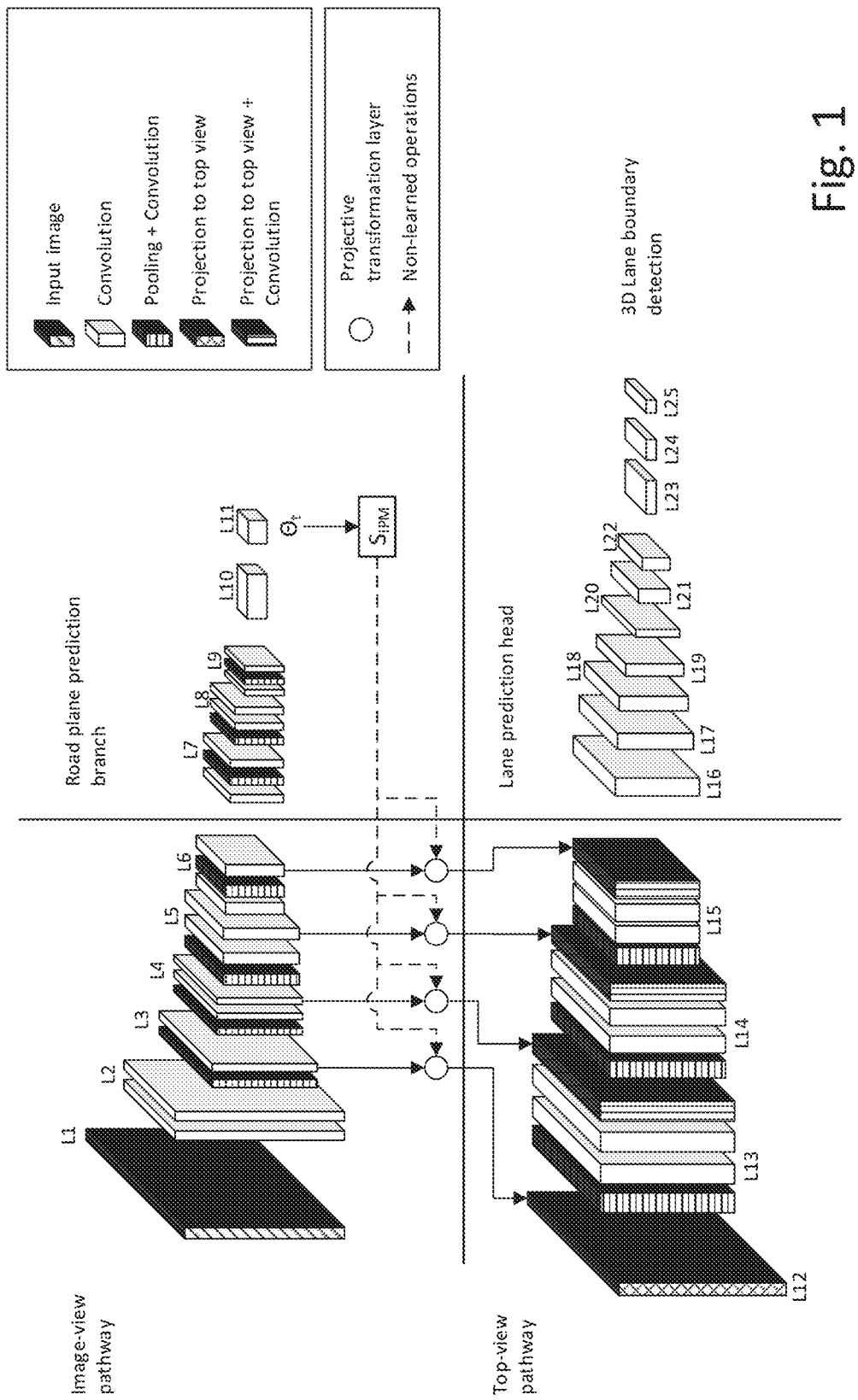
FIG. 1 is a schematic overview of an artificial neural network architecture in accordance with an embodiment of the invention.

A schematic overview of an example of a "suitable artificial neural network" or suitable self-learning model is illustrated in FIG. 1. The depicted architecture is known as "3D-lanenet" and fully described by Garnett N. et al. (2019), 3d-lanenet: End-to-end 3d multiple lane detection, 2019. The model comprises a dual pathway that includes convolutional, max pooling and dense layers together with a projective transformation layer that transforms the feature maps from image-view to top-view.

The network contains a set of layers that are clustered into L-layers, and specific details are listed in Table 1 below containing information about each layer of the network. Information passed to the network is split up and processed in two parallel pathways via the so called dual-pathway backbone. The model can be divided into four quadrants, which may be referred to as Image-view pathway, Road plane prediction branch, Top-view pathway, and Lane prediction head.

TABLE 1

Table containing information about the dimensionality of the L-layers.

| L-layer | Width | Height | # Filters |
|---|---|---|---|
| 1 | w | h | N/A |
| 2 | w | h | 64 |
| 3 | w/2 | h/2 | 128 |
| 4 | w/4 | h/4 | 256 |
| 5 | w/8 | h/8 | 512 |
| 6 | w/16 | h/16 | 512 |
| 7 | w/32 | h/32 | 256 |
| 8 | w/64 | h/64 | 128 |
| 9 | w/128 | h/128 | 64 |
| 10 | dim = 1 × 1 × 64 | | |
| 11 | dim = 1 × 1 × 1 | | |
| 12 | $\hat{w}$ = 128 | $\hat{h}$ = 208 | N/A |
| 13 | $\hat{w}$/2 | $\hat{h}$/2 | 128 |
| 14 | $\hat{w}$/4 | $\hat{h}$/4 | 256 |
| 15 | $\hat{w}$/8 | $\hat{h}$/8 = 26 | 256 |
| 16 | $\hat{w}$/8 | 24 | 64 |
| 17 | $\hat{w}$/8 | 22 | 64 |
| 18 | $\hat{w}$/8 | 20 | 64 |
| 19 | $\hat{w}$/8 | 16 | 64 |
| 20 | $\hat{w}$/8 | 12 | 64 |
| 21 | $\hat{w}$/8 | 8 | 64 |
| 22 | $\hat{w}$/8 | 4 | 64 |
| 23 | dim = 1 × $\hat{w}$/8 × 256 | | |
| 24 | dim = 1 × $\hat{w}$/8 × 64 | | |
| 25 | dim = 1 × $\hat{w}$/8 × 3(2k + 1) | | |

The first part of the network is the first of the two parallel pathways, the Image-view pathway. This part of the network takes in the RGB-channels of the input image and propagates the information through several convolutional and max pooling layers, following the structure of the first part of the standard VGG16 network. In the image-view pathway, as information is reduced, the filters are swept over the image in the original image 2D-space. Here information about the original image is preserved and sent to the Road plane prediction branch. Furthermore, the signal from the L-layers [3, 4, 5, 6] is sent to the Top-view pathway via the Projective transformation layer which is described in detail later.

From the Image-view pathway the output features of L-layer 6 is sent to the Road plane prediction branch, which goes through a similar process as the Image-view pathway of convolving and max pooling. The information is then sent to the L-layer 10 and 11 which are two fully connected layers resulting in two values: the predicted position and pitch of the camera $\theta_t$ (see FIG. 1). The predicted pitch and height is then sent together with the outputs from L-layers [3, 4, 5, 6] to the Projective transformation layer.

The Projective transformation layer is able to create feature maps corresponding spatially to a virtual top-view by performing a differentiable sampling of the input features corresponding to the image plane, without affecting the number of input channels. By utilizing the information of the camera intrinsic matrix together with the predicted height and pitch we are able to determine the location of the top-view plane in the image-plane.

The second path of the parallel pathway is the Top-view pathway where all features are represented in a top-view plane. Following a similar procedure as in the Image-view pathway, the signals are convolved and max pooled with the addition of concatenation of the projected outputs of the feature maps from the L-layers[3, 4, 5, 6]. This means that the spatial features gathered in both the image-view plane and the top-view plane are combined. The signal is then sent to the Lane prediction head where the final predictions of the 3D-Lanes are made.

The final part of the network is the Lane Prediction head, which receives the output features of L-layer 15 and further convolves that information. The final output of L-layer 25 are the predicted 3D-Lanes represented with lane anchors.

For 3D-Lanenet, a lane is represented by being connected to the "anchor" closest to the lane. The shape of the lane is described by offsets in height and width from the connected anchor line at different predefined values (y) in the forward direction. For example, y may be set to 6.5, 10, 15, 20, 30, 40, 50, 60, 80, 100 meters in front of the vehicle. The network may further be configured to predict a probability that a lane is found at each anchor line. This results in an output dimension dim=#anchors×(2k+1)=336, where k=10 is the number of y-points in the forward direction.

Since 3D-lanenet essentially casts the lane detection task as an object detection task, it works in a similar fashion as one-stage object detectors by using the concept of anchors to make predictions (i.e. to generate 3D lanes). In this case, the set of anchors $\{A^i\}_{i=1}^{N}$ has equally spaced longitudinal lines with zero height and constant lateral offset. Each anchor is represented by the set of k points in the coordinate system $C_{road}$ given by $\{X_A^i, y_j, 0\}_{i=1}^{N}$, where $y=\{y_j\}_{j=1}^{k}$ is common for all anchors and specifies the predetermined values in the longitudinal direction and $X_A^i$ is the constant lateral offset of anchor $A^i$. With respect of the N anchors, the output of the network comprises a confidence prediction $p^i$ that describes whether the anchor i is associated with a lane or not, as well as predictions $(x^i, z^i) = \{(x_j^i, z_j^i)\}_{j=1}^{k}$ that correspond to lateral and vertical offsets with respect to the k points of anchor i. In summary, the predictions of $(x_j^i, z_j^i)$ correspond to the point in 3D space given by $\{A_A^i + y_j^i, y_j, z_j^i\}$ in the coordinate system $C_{road}$.

For the purpose of training, the ground truth lanes may be assigned to the closest anchor line at $y_{ref}$=20 m. If more than one lane are the "closest" lanes to the same anchor line, the longest lane may be assigned to that anchor line, while the other lanes are disregarded during training. Moreover, any lanes that do not cross $y_{ref}$ inside the valid top view region may be disregarded during both training and validation.

It should be noted that the 3D-lanenet architecture is merely one example out of several possible suitable artificial neural networks, and should not be construed as limiting to the present invention. Another example of an artificial neural network or model configured for 3D lane detection is Gen-lanenet (see e.g. Guo Y. et al. (2020) *Gen-LaneNet: A Generalized and Scalable Approach for 3D Lane Detection* for further details of that architecture).

Unsupervised Training (Training on Unlabelled Data)

Figure 2:
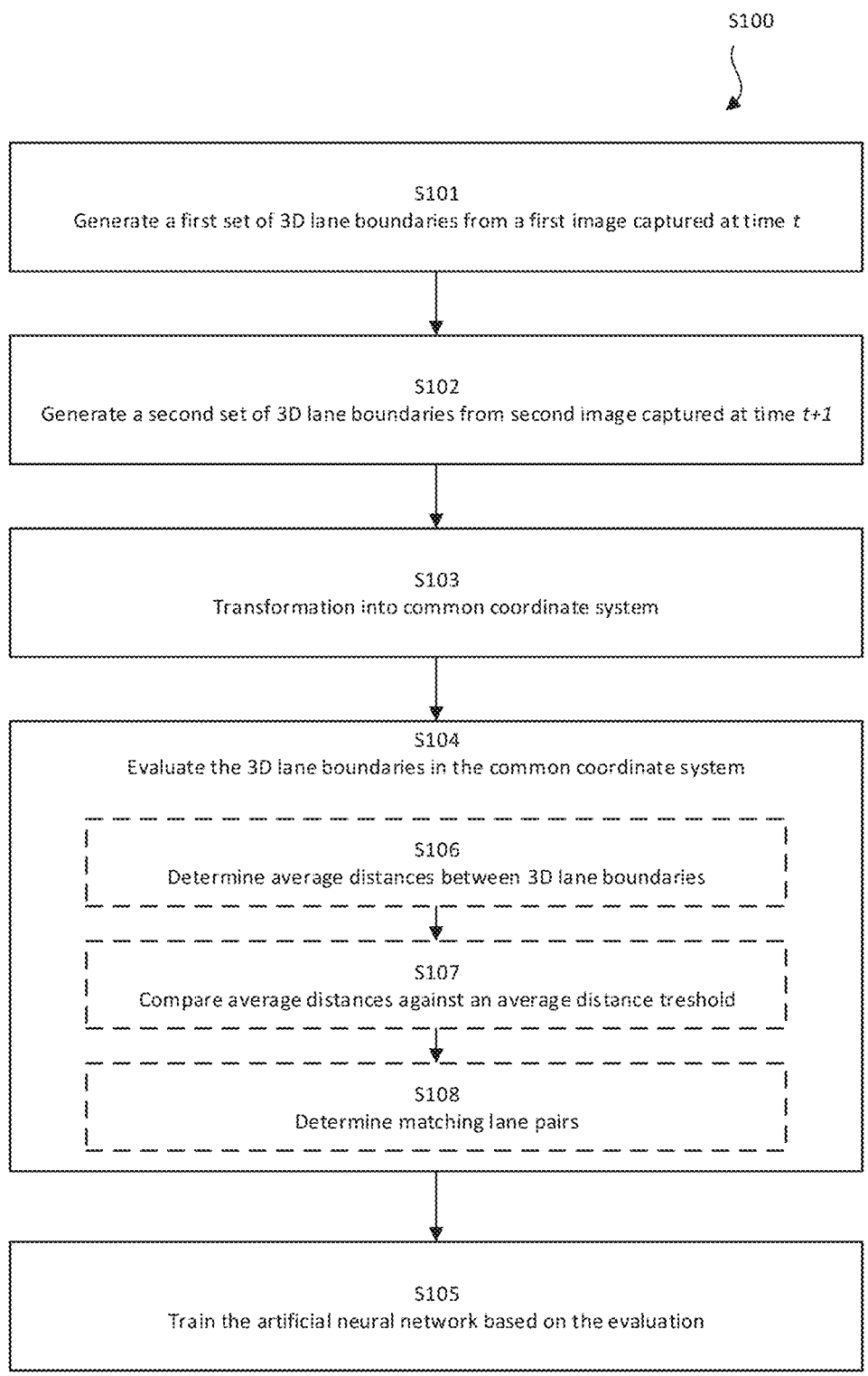
FIG. 2 is a schematic flowchart representation of a method for training an artificial neural network configured for 3D lane detection based on unlabelled image data from a vehicle-mounted camera in accordance with an embodiment of the invention.

Moving on, FIG. 2 is a schematic flowchart representation of a method S100 for training an artificial neural network (ANN) configured for 3D lane detection based on unlabelled image data from a vehicle-mounted camera in accordance with an embodiment of the invention. The herein proposed method of unsupervised training is at least partly based on the realization that one can assume a consistency of 3D lanes in video sequences, and therefore utilize the notion of a spatio-temporal consistency loss in order to train the ANN.

The method S100 comprises generating S101, by means of the artificial neural network, a first set of (predicted/estimated) 3D lane boundaries (may also be referred to as 3D lanes) in a first coordinate system based on a first image captured by the vehicle-mounted camera. The first image may for example be referred to image taken at time t.

Further, the method S100 comprises generating S102, by means of the artificial neural network, a second set of (predicted/estimated) 3D lane boundaries in a second coordinate system based on a second image captured by the vehicle mounted camera. The second image is captured at a later moment in time compared to the first image. Moreover, the first image and the second image contain at least partly overlapping road portions. Accordingly, the second image may be referred to as image taken at time t+1. Here, the first and second coordinate systems may be in the aforementioned $C_{road}$ coordinate system (see e.g. FIG. 6) where the forward direction is aligned with the road surface, but with different origins.

The method S100 further comprises transforming S103 at least one of the second set of 3D lane boundaries and the first set of 3D lane boundaries based on positional data associated with the first image and the second image, such that the first set of 3D lane boundaries and the second set of 3D lane boundaries have a common coordinate system. The positional data may for example be processed Global Navigation Satellite System (GNSS) data obtained from an on-board localization system (e.g. a GPS unit). In other words, the second set of 3D lane boundaries, which may be provided in Goad at time t+1, are transformed S103 to the coordinate system of the first set of 3D lane boundaries, i.e. to $C_{road}$ at time t.

Still further, the method S100 comprises evaluating S104 the first set of 3D lane boundaries against the second set of 3D lane boundaries in the common coordinate system in order to find matching lane pairs of the first set of 3D lane boundaries and the second set of 3D lane boundaries. This may for example be done by formulating the evaluation process S104 as a bipartite matching problem and using a min-cost-flow solver.

In accordance with some embodiments, the step of evaluating S104 the first set of 3D lane boundaries against the second set of 3D lane boundaries in the common coordinate system comprises determining S106 an average distance between each lane of the first set of 3D lane boundaries and each lane of the second set of 3D lane boundaries in the common coordinate system. Then, the determined S106 average distances may be compared S108 against an average distance threshold, and each lane pair having a determined S106 average distance below the average distance threshold is/are determined S108 as a matching lane pair.

Further, the method S100 comprises updating S105 one or more model parameters of the artificial neural network based on a spatio-temporal consistency loss between the found matching lane pairs of the first set of 3D lane boundaries and the second set of 3D lane boundaries. In other words, the artificial neural network is trained S105 based on the spatio-temporal consistency loss between the found matching lane pairs of the first set of 3D lane boundaries and the second set of 3D lane boundaries.

Moreover, in some embodiments, the step of updating S105 one or more parameters of the artificial neural network comprises penalizing the artificial neural network based on the spatio-temporal consistency loss between matching lane pairs of the first set of 3D lane boundaries and the second set of 3D lane boundaries. As readily understood by the skilled reader, the ANN may alternatively be updated by "rewarding" the ANN instead of "penalizing" the ANN based on specific implementations. The spatio-temporal consistency loss is, in accordance with some embodiments, based on a Euclidean distance between matching lane pairs of the first set of 3D lane boundaries and the second set of 3D lane boundaries.

In more detail, the herein disclosed method for unsupervised training is at least partly based on the assumption of consistency of 3D lanes in video sequences (i.e., a series of images). In general, it is reasonable to assume that some parts of the lanes observed in one frame of a video sequence are also observed in the next frame (assuming that the time interval between two frames is not too large or above some threshold). Therefore, the "predicted" 3D lanes (i.e., the 3D lane boundaries generated by the ANN) of two such frames should partly overlap/be close together in 3D space, if the predictions are somewhat correct. The herein proposed method leverages this fact and constitutes a framework for training an AAN configured to generate 3D lane boundaries from image data to make consistent predictions on unlabelled video data.

Further, given two images from a video sequence one can impose some notion of consistency on the predicted/generated 3D lane boundaries as these should partly overlap for correct predictions. However, it is not certain that consistent predictions necessarily are correct. For example, if both images from the video sequences are taken from the same position (i.e. the vehicle is standing still), the predicted 3D lane boundaries will be consistent as long as the predictions are the same in both frames. That is, the ANN can predict any kind of lanes in both frames and be consistent, but not necessarily correct. One the other hand, if the vehicle has moved between the two frames it is likely that the vehicle's relative position to the lanes as well as the lane curvature (as viewed from the vehicle) changes between the two frames. In this case, making correct predictions appears to be the only possibility for the network to be consistent. This observation may accordingly be used as a constraint on the unlabelled dataset. Stated differently, in some embodiments, the first image and the second image are captured at different geographical positions. More specifically, the first image and the second image may be captured at different geographical positions along the vehicle's traveling direction such that the two images have overlapping content.

Moreover, another concern regarding the consistency of lanes is that lanes visible in one frame, may not always be visible in the following/subsequent frame. Particularly in urban environments where lane topologies are complex and can change over short distances. However, due to the regularity of lanes on highways, this road type appears to be well suited for imposing consistency. In more detail, the fact that the lane topologies are usually constant over far distances on highways makes it possible to impose consistency between frames/images even though the vehicle has significant movement between the frames/images. Thus, in accordance with some embodiments, the first image and the second image are taken/captured while the vehicle is traveling on a highway or motorway. However, other scenarios are still viable and applicable with the concepts disclosed herein. Thus, in accordance with some embodiments, the first and second images are taken/captured while the vehicle is traveling in an urban environment. In more detail, due to the above-mentioned reasons (lane topologies not being constant over longer distances), one may employ different requirements (e.g., reduce a distance threshold for the "common parts" (i.e., overlapping portions) of the two images for images taken in urban environments as compared to images taken while the vehicle is traveling on a highway.

It is now time to formalize the notion of consistency between two sets of lane boundaries. If one knows that a predicted lane of frame t corresponds to the same ground truth lane as a predicted lane of frame t+1, it makes sense to enforce spatial consistency on these predictions such that they align well in 3D space. However, since the ground truth lanes are unknown for the unlabelled data one is forced to guess which predictions correspond to the same ground truth. This guessing game becomes quite difficult since the vehicle's movement relative to the lanes between the two frames makes it so that the responsibilities of the anchor lines of the ANN may change between the frames. For example, it may be the case that the seventh anchor line in frame t predicts the same lane as the tenth anchor in frame t+1. Since there is no easy way of known which lane each anchor will predict in the two frames, one can investigate this explicitly by matching the predicted 3D lane boundaries of the two frames/images. This is done by first transforming the predicted 3D lane boundaries of frame t+1 to frame t (or vice versa) using e.g. the 3D coordinate transformation between these two frames given by processed GPS data. When matches between the predicted lanes have been found, it is possible to enforce spatial consistency between the matched lane pairs as well as penalizing/rewarding the ANN's confidence predictions. A method for computing the spatio-temporal consistency loss is schematically illustrated in FIG. 3.

However, firstly, in reference to the ANN's confidence predictions, in some embodiments, the artificial neural network is configured to generate a set of anchor lines where each anchor line is associated with a confidence value indicative of a presence of a lane boundary at the corresponding anchor line. Thus, in some embodiments, the method S100 further comprises disregarding any anchor line associated with a confidence value below a confidence value threshold in the transformation step S103.

Furthermore, in some embodiments, the step of updating S105 the one or more model parameters of the artificial neural network is further based on the confidence values of any anchor lines associated with matching lane pairs and any anchor lines associated with non-matching lane pairs. In more detail, the one or more parameters of the ANN are updated such that any anchor lines associated with matching lane pairs should predict a normalized confidence level of 1,0 and any anchor lines associated with non-matching lane pairs should predict a normalized confidence value of 0. This may for example be done by using a cross-entropy loss function.

Figure 3:
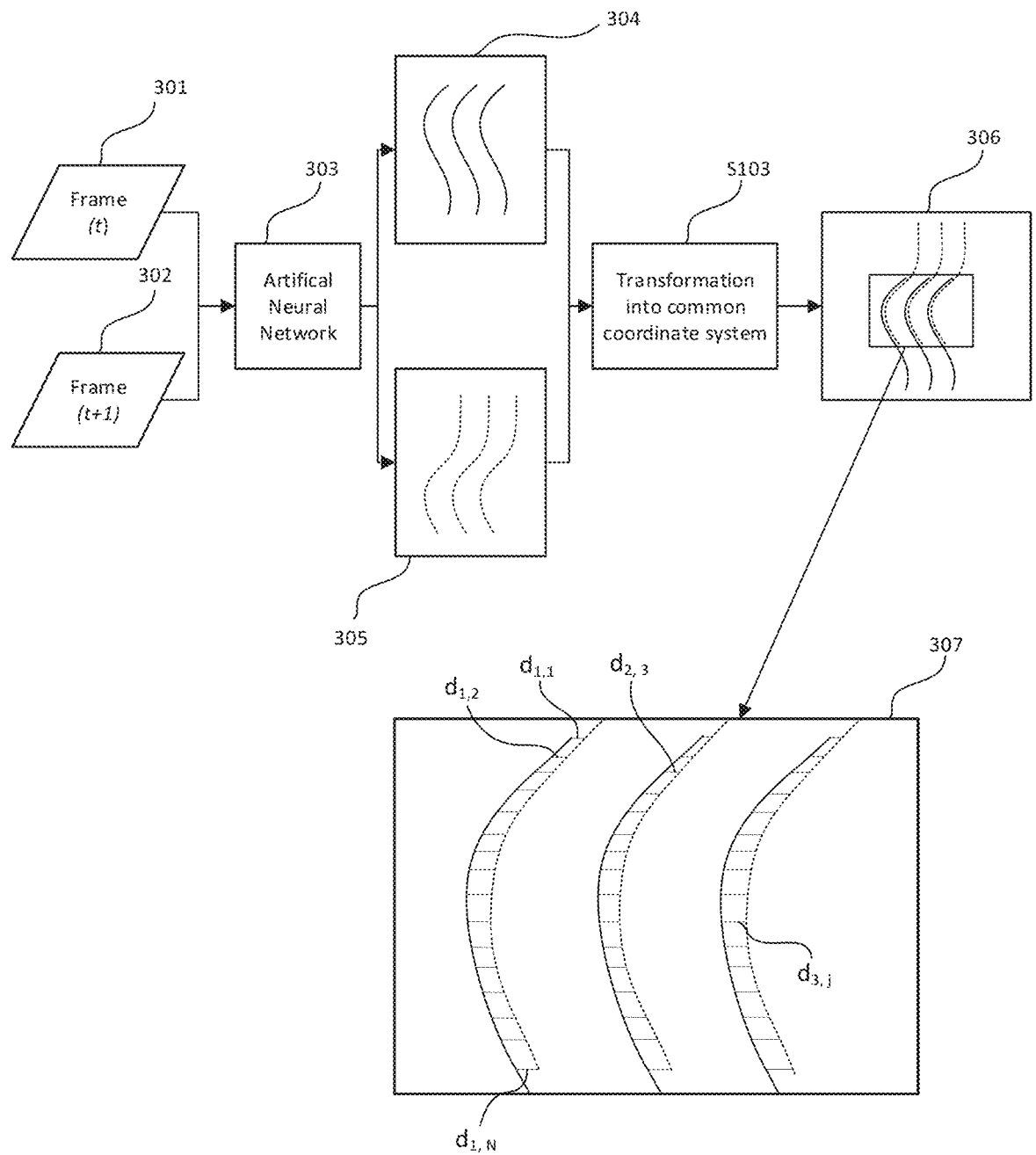
FIG. 3 is a schematic flowchart indicative of how the spatio-temporal consistency loss between two sets of predicted/generated 3D lane boundaries is computed in accordance with some embodiments of the invention.

Turning to FIG. 3, which illustrates a schematic flowchart indicative of how the spatio-temporal consistency loss between two sets of predicted/generated 3D lane boundaries is computed. In more detail, a first image/frame t and a second image/frame t+1 are provided as input to the artificial neural network 303, which outputs a first set of 3D lane boundaries 304 and a second set of 3D lane boundaries 305. At least one of the generated lane boundaries 304, 305 are transformed S103 so to have a common coordinate system, such that they can be evaluated. The resulting overlap and offset di, j between the two sets of 3D lane boundaries are schematically indicated in box 306 and with an enlarged view in box 307.

In the following, a mathematical definition of the spatio-temporal consistency loss that may be used to penalize both lane geometry and confidence predictions is provided. Here, the artificial neural network is assumed to be based on the 3D-lanenet architecture as described in the foregoing. Accordingly, given the predictions $\{p^i\}_{i=1}^{N}$ and $\{x^i, z^i\}_{i=1}^{N}$ of frame t 301 and $\{\hat{p}^i\}_{i=1}^{N}$ and $\{\hat{x}^i, \hat{z}^i\}_{i=1}^{N}$ of frame t+1 302, all the predictions with confidence less than a confidence threshold $p_{th}$ are disregarded. As mentioned, the ANN 303 is configured to generate a set of anchor lines where each anchor line is associated with a confidence value (p) indicative of a presence of a lane boundary at the corresponding anchor line. The remaining predictions are then transformed into 3D space by using the fact that the prediction $(x_j^i, z_j^i)$ corresponds to the point in 3D space given by $(X_A^i + x_j^i, y_j, z_j^i)$ in the coordinate system $C_{road}$.

The predictions of frame t+1 302 are transformed S103 to $C_{road}$ of frame t 301 and the lanes are re-sampled at common longitudinal positions by piecewise linear interpolation (see e.g. ref. 306 in FIG. 3). The re-sampled lane that originated from predictions $p^i$ and $(x^i, z^i)$ is now defined by a new set of points in 3D space given by $(x_{ext}^i, y_{ext}, z_{ext}^i)$, where each of these vectors are of some length q and $y_{ext}$ is a vector of pre-determined sampling positions. Similarly, the re-sampled lane that originated from the predictions $\hat{p}^i$ and $(\hat{x}^i, \hat{z}^i)$ of frame t+1 302 is denoted by $(\hat{x}_{ext}^i, y_{ext}, \hat{z}_{ext}^i)$. Note that the longitudinal positions given by $y_{ext}$ is the same for the predictions of both frames. Furthermore, $y_{ext}$ only corresponds to points that lie within the common region (indicated by box 306) of the lanes from both frames 301, 302. This may for example be in the region of 50-100 meters in front of the vehicle. This will however depend on the distance travelled by the vehicle between the two frames 301, 302.

The re-sampled lanes are then matched using e.g. a min-cost-flow algorithm where the cost of matching lane m with lane n may be defined as $$cost_{m,n} = \sum_{j=1}^{K} d_j^{mn}, \qquad (1)$$

where $$d_j^{mn} = \begin{cases} \log\left(\sqrt{(x_j^m - x_j^n)^2 + (z_j^m - z_j^n)^2} + 1\right), & \text{if both lanes exist at } j \\ d_{th} & \text{otherwise} \end{cases} \qquad (2)$$

This definition of the cost of matching two lanes is used by the min-cost-flow solver and the global optimal matching is defined as the one that matches the set of lanes (or lane boundaries) with the lowest total cost. By adding a penalty $d_{th}$ for each point that is not covered by both lanes it is possible to match partly overlapping lanes with this method.

Thus, the matched lane pairs that have a smaller average distance than an average distance threshold $d_{th}$ are considered valid matches. The spatio-temporal consistency loss then comprises two components, one for valid matches and one for invalid matches. If the predicted lane given by $p^m$ and $(x^m, z^m)$ of frame t 301 forms a valid match with the predictions $\hat{p}^n$ and $(\hat{x}^n, \hat{z}^n)$ of frame t+1, the spatio-temporal consistency loss between this pair of lanes m and n (or lane boundaries m and n) is computed as $$\mathcal{L}_{match}^{m,n} = \mathcal{L}_p^{m,n} + \mathcal{L}_{xz}^{m,n}, \qquad (3)$$

where, $$\mathcal{L}_{xz}^{m,n} = |x_{ext}^m - \hat{x}_{ext}^n| + |z_{ext}^m - \hat{z}_{ext}^n| \qquad (4)$$

$$\mathcal{L}_p^{m,n} = -\log(p^m) - \log(\hat{p}^n). \qquad (5)$$

The total spatio-temporal consistency loss of all valid matches is accordingly given by $$\mathcal{L}_{match} = \sum_{(m,n)\in V} \mathcal{L}_{match}^{m,n} \quad (6)$$

where V is the set of all valid matches. Finally, a penalty for not finding a match is applied as $$\mathcal{L}_{nomatch} = -\left(\sum_{i\in U_1} \log(1-p^i) + \sum_{i\in U_2} \log(1-\hat{p}^i)\right) \quad (7)$$

where $U_1$ and $U_2$ are the set of all anchor lines of frame t 301 and frame t+1 302 respectively that did not find a valid match.

The total spatio-temporal consistency loss may accordingly be formulated as the sum of the penalty on the matched anchor lines and non-matched anchor lines.

$$\mathcal{L}_c = \mathcal{L}_{match} + \mathcal{L}_{nomatch} \quad (8)$$

As mentioned, in some embodiments the anchor lines that correspond to valid lane matches result in a penalizing/rewarding of the ANN 303 so to predict 1,0 confidence and all other anchor lines result in a penalizing/rewarding so to predict a 0,0 confidence using the cross-entropy loss. In summary, the underlying assumption of penalizing/rewarding the confidence predictions in this manner is that lanes (or lane boundaries) that found a valid match over two frames are likely to be correct, while the lanes that do not are likely to be incorrect predictions.

It should be noted that the geometric part of the spatio-temporal consistency loss penalizes the predictions of the network 303 implicitly by computing the loss based on, for example, $x_{ext}^i$ and $\hat{x}_{ext}^i$ rather than the predictions $x^i$ and $\hat{x}^i$. However, each of the points $\{x_{ext}^i\}_{i=1}^q$ depends linearly on some two points of $\{x^i\}_{i=1}^k$, so it is straight forward to compute the gradients from this formulation. Moreover, the points of $y_{ext}$ that lie outside of the common region (indicated by box 306 in FIG. 3) are removed, such that both predictions of frame t 301 and frame t+1 302 exist for all the remaining points in $y_{ext}$.

Further, the described spatio-temporal consistency loss can be said to entail two hyper parameters, namely the distance threshold $d_{th}$ that defines which matches are valid and the probability threshold $p_{th}$ (may also be referred to as confidence value threshold) that defines which predictions are considered as "positive" predictions. The distance threshold may be set low enough such that the predictions of two adjacent lanes can never be considered valid, meaning that $d_{th}$ is set smaller than a (typical) half-lane width. Naturally, $d_{th}$ should not be too close to zero either, because then essentially no lanes will constitute valid matches. Accordingly, in some embodiments, the average distance threshold $d_{th}$ is set to a value above zero and below a lane width (of the road captured by the images 301, 302). Furthermore, the average distance threshold $d_{th}$ may be set separately for "close range" errors (e.g., within 0-40 meters from the vehicle) and "far range" errors (e.g., within 40-100 meters from the vehicle). In other words, the average distance threshold $d_{th}$ may comprise a plurality of average distance thresholds based on a distance from the vehicle.

Moreover, predictions from the consecutive frames/images could "supervise" each other differently in comparison to having equal importance when penalizing the network if lanes do not align well in 3D space. For example, since it can be assumed that the close range predictions are more accurate than the far range predictions one could argue that it would be better to assign greater importance to the close range predictions, and thus penalize the predictions of the first frame more than those of the second frame. Moreover, in some embodiments, only the lane geometry predictions of the first frame are penalized and the predictions of the second frame are not penalized. This is because it may be assumed that the far range predictions of the first frame cannot supervise the more accurate close range predictions of the second frame.

Moreover, since the spatio-temporal consistency loss as described herein is based on an assumption that the predicted (and matched) lanes or lane boundaries describe the underlying ground truth lanes as well as possible, one can set the probability threshold p_th to the value that resulted in the maximum F-score on a validation set. The F-score is a common metric used for measuring the performance of object detection models. This binary classification metric is based on the two measures that can be calculated from a confusion matrix, namely the precision and recall. The basic underlying principles and uses of F-score is considered to be readily understood by the skilled person in the art, and will for the sake of brevity and conciseness not be further elaborated upon herein.

It should be noted that even though the foregoing disclosure is mainly focused on considering consistency between image pairs, the teachings herein may be expanded to more than two frames/images, such as, e.g., 5, 10, or 15 consecutive images in a video sequence. In other words, in accordance with the teachings herein, it may be possible to impose consistency over several (more than two) frames/images. In more detail, this could reduce the number of missed lanes/faulty matches further by giving the ANN more chances to detect any inconsistencies between more than two consecutive frames. For example, if the network predicts the same lanes for ten consecutive images it should be very likely that these predictions indeed correspond to all ground truth lanes of the image. However, even if it may be better to leverage the assumed consistency of lanes through more than two consecutive frames, the trade-off would be longer training times.

Moreover, it should be noted that the teachings herein are analogously applicable for road edge detection. Thus, in some embodiments, the ANN is configured to 3D road edge detection (may also be referred to as 3D road boundary detection) based on unlabelled image data from a vehicle-mounted camera. The methods are analogous in that it follows the same principles with the difference that the features related to "3D lane boundaries" are replaced with "3D road edges". The road edges and the lane boundaries may be treated simultaneously or as alternatives.

Semi-Supervised Training

Before the network is trained on unlabelled data, one may initialize the network and train the network until convergence on a labelled dataset before training the network further on the unlabelled dataset as described above. This may be referred to as a semi-supervised training scheme and is schematically depicted by the flowchart S500 in FIG. 5.

However, in accordance with some aspects of the present invention, it is herein proposed a method S400 for constructing a labelled 3D lane dataset suitable for training an artificial neural network. In more detail, the method S400 includes using accumulated dense depth maps 413 (from aggregated LiDAR point clouds) together with 2D lane instance annotations 411, 412 and then applying some post processing S403, S404 to refine the extracted lanes. The depth maps 413 are accordingly used as ground truth depths of the pixels in the associated images 410 captured by the monocular camera. The 2D lane instances may be annotated as polygons 411 or polylines 412.

If the 2D lane instances are annotated as polygons, the associated depth map of all pixels belonging to each lane instance may be considered to form 3D point clouds that represent the lanes (step S401). In other words, the method S400 may comprise combining the 2D polygon lane annotations 411 and projected depth maps to construct 3D lane point clouds for each lane instance using the camera intrinsic matrix. In order to uniquely determine the lane position for each value in the forward direction, the point clouds are divided S401 into bins of a desired size (e.g. 20 cm) in the forward direction and a median (or mean) value of each populated bin is computed. Due to noise in depth maps 413 one may adopt a filtering process S404 for outliers. For example, one can use the density based clustering algorithm DBSCAN. Additionally one can employ RANSAC to filter any outliers that DBSCAN missed.

However, if the 2D lane instances are annotated as polylines 412, a reasonable margin/radius pixel may be considered around each annotated point of the lane polyline to find the associated depth map. In other words, the method S400 may comprise combining S402 the 2D polyline lane annotations 412 and projected depth maps 413 to construct 3D lane point clouds for each lane instance using the camera intrinsic matrix. Once this is done, the 3D position of each lane instance may be determined for each lane. Similarly as before, a filtering step S404 may be employed to remove outliers with DBSCAN and RANSAC.

In more detail, with regards to the filtering S404, since the depth maps from the accumulated LiDAR point clouds 413 are likely to include some noise there may be some need for filtering the 3D lane point clouds for outliers. Due to the regularity of the lanes' geometry one can assume that the lanes' lateral and vertical position change slowly over short distances in the forward direction. In order to leverage this assumption, the lateral and vertical axes may be scaled up such that DBSCAN is more sensitive to changes in these dimensions. Therefore, if some points of each lane have different vertical or lateral position from the most nearby points (in the forward direction) these are classified as outliers. DBSCAN is effective in filtering outliers when the density of the outliers is much smaller than the density of the inliers. However, the density of the inliers can be very low in the case of 3D lanes, especially in the far range or due to partial occlusion and dashed lane markings. In order to deal with sparse inliers in the far range, DBSCAN may advantageously be applied in two different ranges separately. Once in the close range (e.g. any range or subrange between 0 and 40 meters from the vehicle) and once in the far range (e.g. any range or subrange between 40 and 100 meters from the vehicle), using different hyper parameters for the algorithm to match the general density of the lanes in both regions. Thereafter, RANSAC may be applied to filter any outliers that DBSCAN may have missed. This may be advantageous in scenarios where large parts of the data are faulty and therefore classified as inliers by DBSCAN due to high density. RANSAC instead leverages the fact that lanes locally are well estimated by lines and removes any points that deviate too much form the best line to fit the data. Hence RANSAC can remove dense clusters of faulty points. Moreover, RANSAC may be applied separately at different distance intervals in the forward direction (e.g. 0-33 meters, 33-67 meters, and >67 meters). This may be advantageous to ensure that not many points are removed simply due to lane curvature or other violations of a straight-line assumption.

Figure 4:
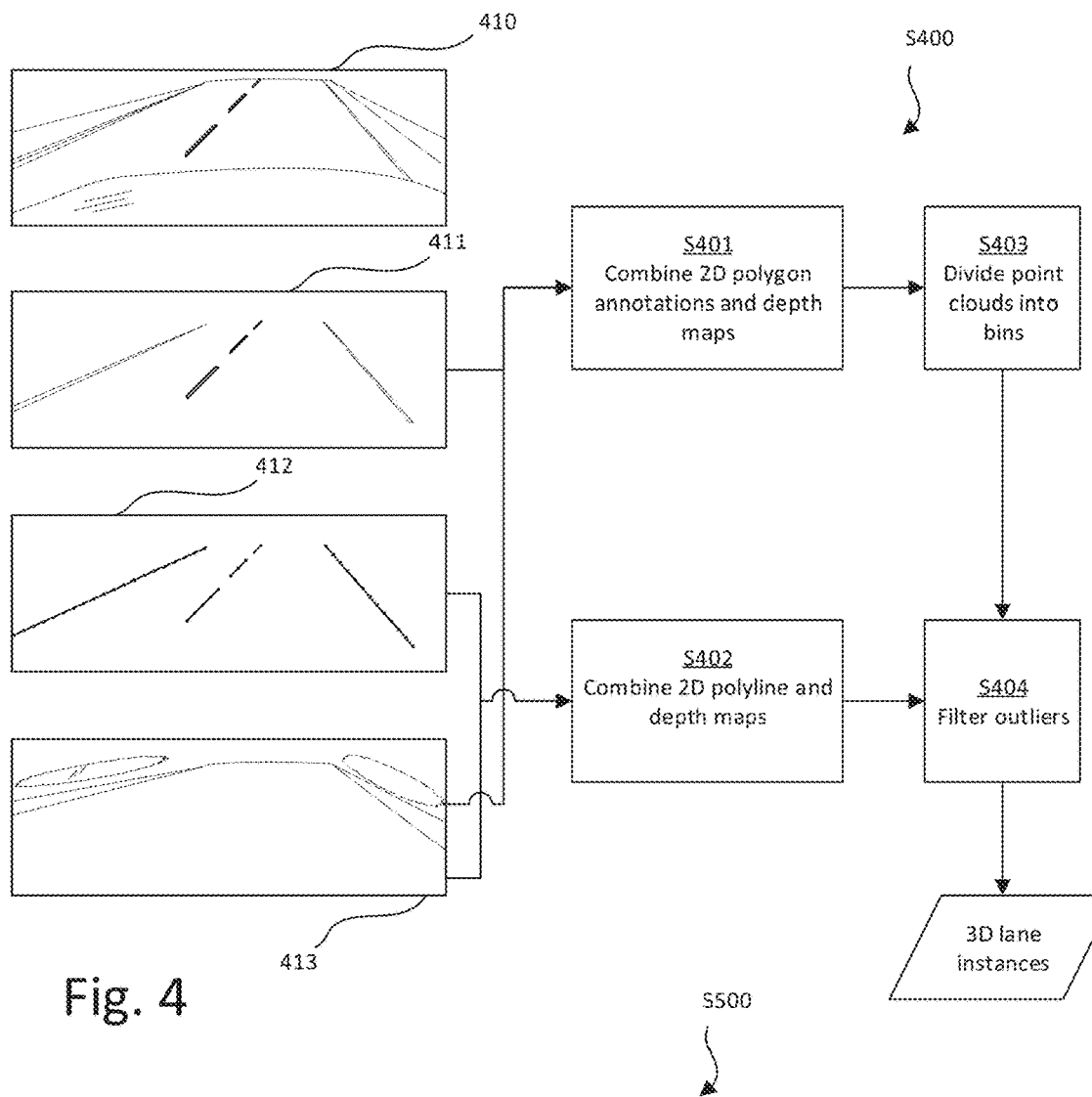
FIG. 4 is a schematic flowchart of a method for constructing a labelled 3D lane dataset in accordance with some embodiments of the invention.
Figure 5:
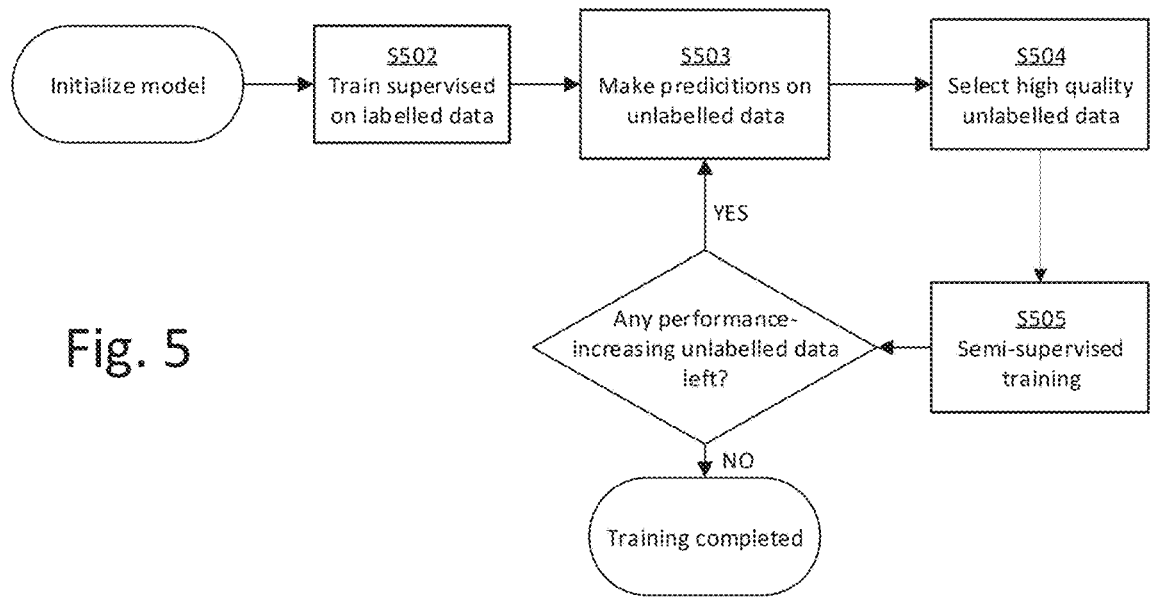
FIG. 5 is a schematic flow chart of a method for semi-supervised training of an artificial neural network configured for 3D lane detection in accordance with an embodiment of the present invention.

Moving on, FIG. 5 illustrates a schematic flowchart representation of a method S500 for semi-supervised training of an artificial neural network configured for 3D lane detection in accordance with some embodiments. The method comprises initializing the artificial neural network by setting some appropriate initialization values. Alternatively, one can use an already initialized ANN. Further, the method S500 comprises training S502 the ANN on a labelled dataset (e.g. a dataset generated by the method depicted in FIG. 4) until convergence is reached.

The method S500 further comprises making S503 predictions on unlabelled data in order to find matches between predicted/generated 3D lane boundaries in each image pair (as described in the foregoing in reference to FIGS. 2 and 3). The found matches will then define how the ANN should be updated (penalized/rewarded) with the spatio-temporal consistency loss during training on this unlabelled data. Furthermore, the method S500 comprises selecting or adding S504 the unlabelled dataset for which the ANN found a sufficient number of matches (e.g. above a threshold) to the training set, and training S505 the ANN in a semi-supervised fashion based on the labelled and the unlabelled data (i.e. the formed training set). The training set accordingly comprises the labelled and the "cherry-picked" unlabelled data.

The method S500 then comprises iterating steps S503, S504 and S505 until the unlabelled dataset is exhausted or until no further improvements to the ANN are made.

Executable instructions for performing these functions are, optionally, included in a non-transitory computer-readable storage medium or other computer program product configured for execution by one or more processors.

Apparatus

FIG. 6 is a schematic side-view of a vehicle 1 comprising an apparatus 10 for training an artificial neural network configured for 3D lane detection based on unlabelled image data from a vehicle-mounted camera 7. The apparatus 10 comprises control circuitry 11 configured to generate, by means of the artificial neural network, a first set of 3D lane boundaries in a first coordinate system based a first image captured by the vehicle-mounted camera. The control circuitry 11 is further configured to generate, by means of the artificial neural network, a second set of 3D lane boundaries in a second coordinate system based on a second image captured by the vehicle mounted camera. The second image is captured at a later moment in time compared to the first image and the first image and the second image contain at least partly overlapping road portions.

Further, the control circuitry 11 is configured to transform at least one of the second set of 3D lane boundaries and the first set of 3D lane boundaries based on positional data associated with the first image and the second image, such that the first set of 3D lane boundaries and the second set of 3D lane boundaries have a common coordinate system. The positional data may example be obtained from a localization system 5 (e.g. a GPS unit) of the vehicle 1. The control circuitry 11 is further configured to evaluate the first set of 3D lane boundaries against the second set of 3D lane boundaries in the common coordinate system in order to find matching lane pairs of the first set of 3D lane boundaries and the second set of 3D lane boundaries. Moreover, the control circuitry 11 is configured to update one or more model parameters of the artificial neural network based on a spatio-temporal consistency loss between the found matching lane pairs of the first set of 3D lane boundaries and the second set of 3D lane boundaries.

Thus, the training of the ANN may accordingly be employed in a federated learning scheme where the local updates to the model parameters of the ANN may be transmitted to a central entity connected to a plurality of vehicles, where they may be consolidated in order to perform a "global" updated to the ANN based on the received local updates. However, it should be noted that the apparatus 10 need not necessarily be provided in a vehicle, but may be employed either in a remote server, or in plurality of remote servers, for instance in a plurality of servers in communication with each other, a so called cloud solution. In other words, in some embodiments, the apparatus 10 may be in the form of (e.g., implemented as) a central service, a cloud service (provided by a cloud environment, e.g., a cloud computing system, comprising one or more remote servers, e.g., distributed cloud computing resources). The necessary training set (labelled and/or unlabeled image data) may accordingly be provided in a memory device connected to the apparatus.

The vehicle 1 further comprises a perception system 6 and a localization system 5. A perception system 6 is in the present context to be understood as a system responsible for acquiring raw sensor data from on sensors such as cameras 6, LIDARs and RADARs, ultrasonic sensors, and converting this raw data into scene understanding. In particular, the vehicle 1 has at least one vehicle-mounted camera 6 for capturing images of (at least a portion of) a surrounding environment of the vehicle. The localization system 5 is configured to monitor a geographical position and heading of the vehicle, and may in the form of a Global Navigation Satellite System (GNSS), such as a GPS. However, the localization system may alternatively be realized as a Real Time Kinematics (RTK) GPS in order to improve accuracy. Moreover, the vehicle 1 may have access to a digital map (e.g. a HD-map), either in the form of a locally stored digital map or via a remote data repository accessible via an external communication network 2 (e.g. as a data stream). In some embodiments, the access to the digital map may for example be provided by the localization system 5.

Further, the vehicle 1 may be connected to external network(s) 2 via for instance a wireless link (e.g. for transmitting and receiving one or more model parameters). The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including, for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the apparatus 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 14 may also provide the possibility to acquire sensor data directly or via dedicated sensor control circuitry 6 in the vehicle. The communication/antenna interface 13 may further provide the possibility to send output to a remote location (e.g. remote operator or control centre) by means of the antenna 5. Moreover, some sensors in the vehicle may communicate with the apparatus 10 using a local network setup, such as CAN bus, I2C, Ethernet, optical fibres, and so on. The communication interface 13 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in a server in communication with the vehicle, a so called cloud solution. For instance, image data may be sent to an external system and that system performs the methods disclosed in the foregoing. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the invention. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as claimed in the below described patent embodiments should be apparent for the person skilled in the art.

The invention claimed is:

1. A method for training an artificial neural network configured for 3D lane detection based on unlabelled image data from a vehicle-mounted camera, the method comprising:
   generating, by means of the artificial neural network, a first set of 3D lane boundaries in a first coordinate system based a first image captured by the vehicle-mounted camera;
   generating, by means of the artificial neural network, a second set of 3D lane boundaries in a second coordinate system based on a second image captured by the vehicle mounted camera, wherein the second image is captured at a later moment in time compared to the first image and wherein the first image and the second image contain at least partly overlapping road portions;
   transforming at least one of the second set of 3D lane boundaries and the first set of 3D lane boundaries based on positional data associated with the first image and the second image, such that the first set of 3D lane boundaries and the second set of 3D lane boundaries have a common coordinate system;
   evaluating the first set of 3D lane boundaries against the second set of 3D lane boundaries in the common coordinate system in order to find matching lane pairs of the first set of 3D lane boundaries and the second set of 3D lane boundaries; and
   updating one or more model parameters of the artificial neural network based on a spatio-temporal consistency loss between the found matching lane pairs of the first set of 3D lane boundaries and the second set of 3D lane boundaries.

2. The method according to claim 1, wherein the step of updating one or more parameters of the artificial neural network comprises penalizing the artificial neural network based on the spatio-temporal consistency loss between matching lane pairs of the first set of 3D lane boundaries and the second set of 3D lane boundaries.

3. The method according to claim 1, wherein the spatio-temporal consistency loss is based on a Euclidean distance between matching lane pairs of the first set of 3D lane boundaries and the second set of 3D lane boundaries.

4. The method according to claim 1, wherein the step of evaluating the first set of 3D lane boundaries against the second set of 3D lane boundaries in the common coordinate system comprises:
   determining an average distance between each lane of the first set of 3D lane boundaries and each lane of the second set of 3D lane boundaries in the common coordinate system;
   comparing the determined average distances against an average distance threshold; and
   determining each lane pair having a determined average distance below the average distance threshold as a matching lane pair.

5. The method according to claim 1, wherein the first image and the second image are captured at different geographical positions.

6. The method according to claim 1, wherein the artificial neural network is configured to generate a set of anchor lines where each anchor line is associated with a confidence value indicative of a presence of a lane boundary at the corresponding anchor line.

7. The method according to claim 6, further comprising:
   disregarding any anchor line associated with a confidence value below a confidence value threshold in the transformation step.

8. The method according to claim 6, wherein the step of updating the one or more model parameters of the artificial neural network is further based on the confidence values of any anchor lines associated with matching lane pairs and any anchor lines associated with non-matching lane pairs, such that any anchor lines associated with matching lane pairs should predict a normalized confidence level of 1,0 and any anchor lines associated with non-matching lane pairs should predict a normalized confidence value of 0.

9. A non-transitory computer-readable storage medium storing one or more instructions configured to be executed by one or more processors of a processing system, the one or more instructions for performing the method according to claim 1.

10. An apparatus for training an artificial neural network configured for 3D lane detection based on unlabelled image data from a vehicle-mounted camera, the apparatus comprising control circuitry configured to:
   generate, by means of the artificial neural network, a first set of 3D lane boundaries in a first coordinate system based a first image captured by the vehicle-mounted camera;
   generate, by means of the artificial neural network, a second set of 3D lane boundaries in a second coordinate system based on a second image captured by the vehicle mounted camera, wherein the second image is captured at a later moment in time compared to the first image and wherein the first image and the second image contain at least partly overlapping road portions;

transform at least one of the second set of 3D lane boundaries and the first set of 3D lane boundaries based on positional data associated with the first image and the second image, such that the first set of 3D lane boundaries and the second set of 3D lane boundaries have a common coordinate system;

evaluate the first set of 3D lane boundaries against the second set of 3D lane boundaries in the common coordinate system in order to find matching lane pairs of the first set of 3D lane boundaries and the second set of 3D lane boundaries; and update one or more model parameters of the artificial neural network based on a spatio-temporal consistency loss between the found matching lane pairs of the first set of 3D lane boundaries and the second set of 3D lane boundaries.

11. A vehicle comprising:

a camera configured to capture images of at least a portion of a surrounding environment of the vehicle;

a localization system configured to monitor a geographical position of the vehicle; and an apparatus for training an artificial neural network configured for 3D lane detection based on unlabelled image data from the camera, the apparatus comprising control circuitry configured to:

generate, by means of the artificial neural network, a first set of 3D lane boundaries in a first coordinate system based a first image captured by the vehicle-mounted camera;

generate, by means of the artificial neural network, a second set of 3D lane boundaries in a second coordinate system based on a second image captured by the vehicle mounted camera, wherein the second image is captured at a later moment in time compared to the first image and wherein the first image and the second image contain at least partly overlapping road portions;

transform at least one of the second set of 3D lane boundaries and the first set of 3D lane boundaries based on positional data associated with the first image and the second image, such that the first set of 3D lane boundaries and the second set of 3D lane boundaries have a common coordinate system;

evaluate the first set of 3D lane boundaries against the second set of 3D lane boundaries in the common coordinate system in order to find matching lane pairs of the first set of 3D lane boundaries and the second set of 3D lane boundaries; and update one or more model parameters of the artificial neural network based on a spatio-temporal consistency loss between the found matching lane pairs of the first set of 3D lane boundaries and the second set of 3D lane boundaries.

12. A remote server comprising the apparatus according to claim 10.

13. A cloud environment comprising one or more remote servers according to claim 12.

* * * * *